(No Model.)  
2 Sheets—Sheet 1.
C. H. LEGGETT.
INSECT POWDER DISTRIBUTER.
No. 421,942.  
Patented Feb. 25, 1890.
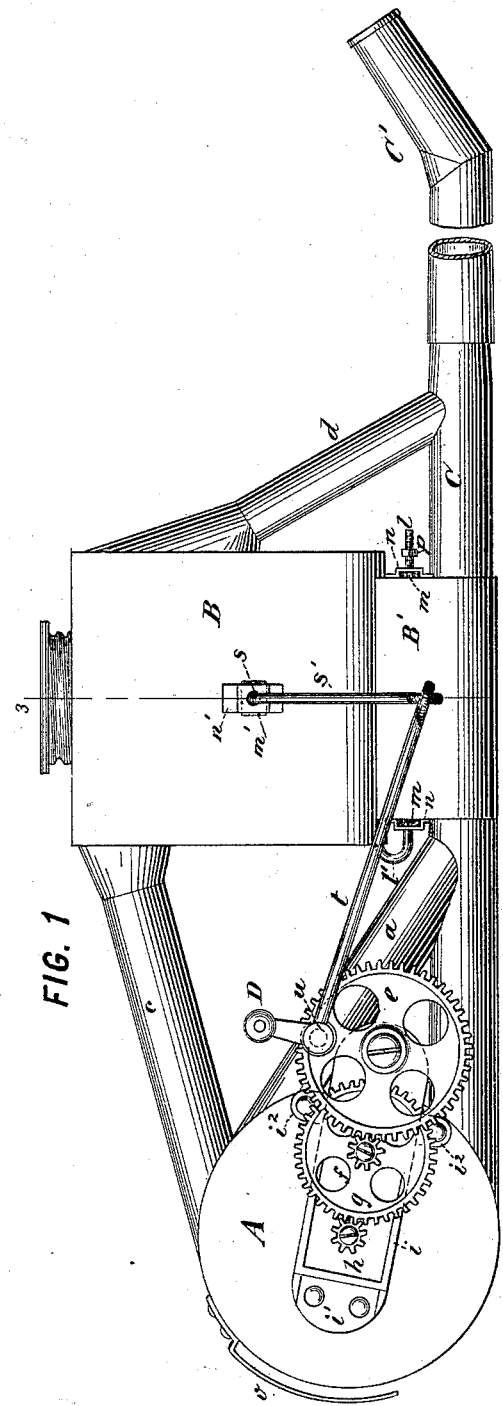
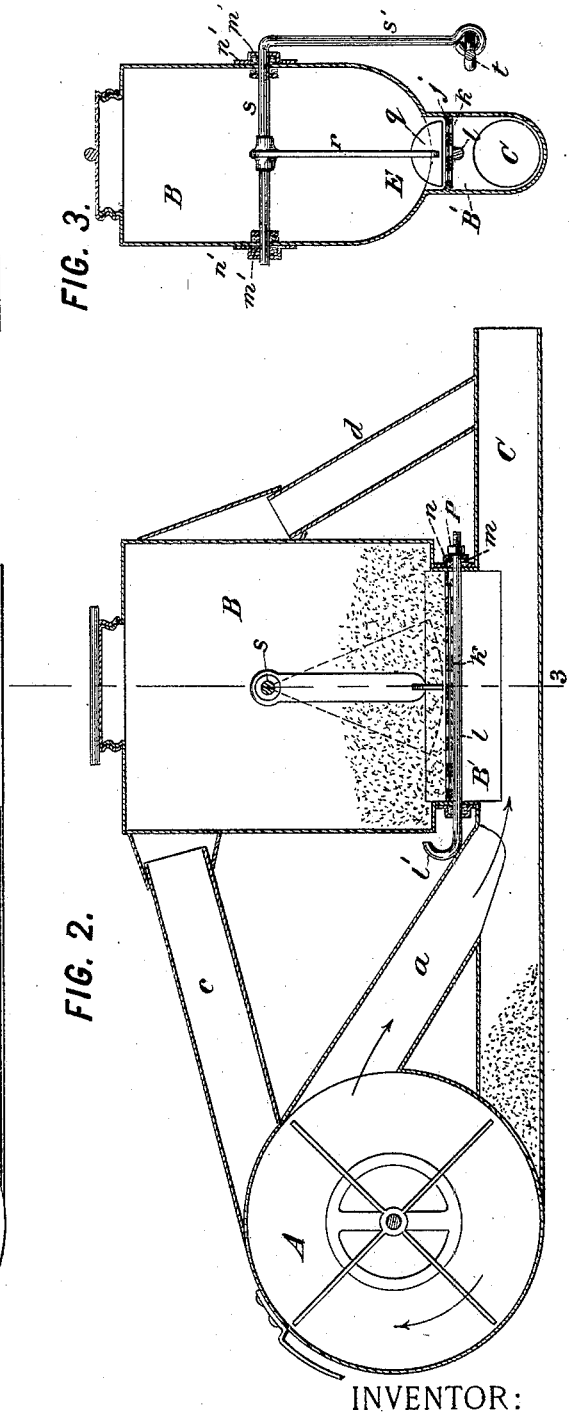
WITNESSES:  
John Becker  
Fred White
INVENTOR:  
Clinton H. Leggett,  
By his Attorneys,  
Arthur E. Fraser & Co.

(No Model.) 2 Sheets—Sheet 2.
C. H. LEGGETT.
INSECT POWDER DISTRIBUTER.
No. 421,942. Patented Feb. 25, 1890.
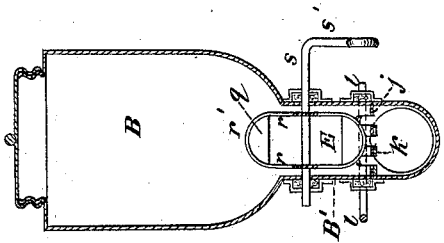
FIG. 6.
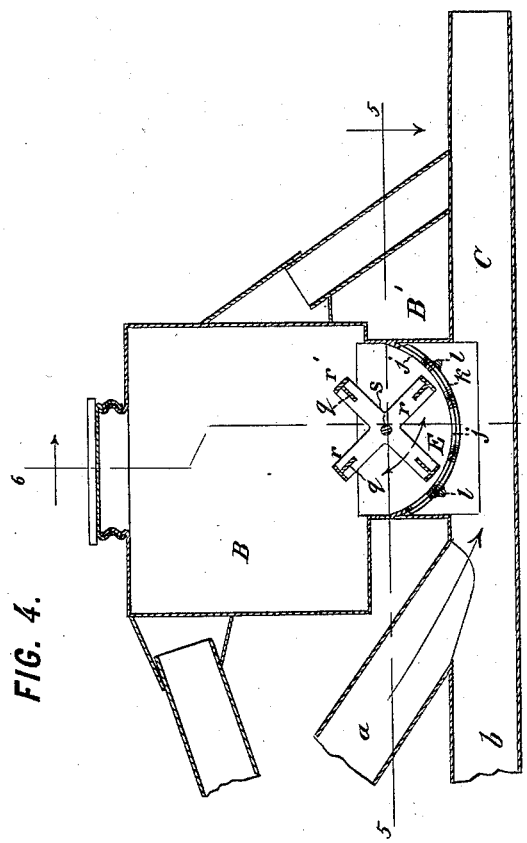
FIG. 4. FIG. 5.
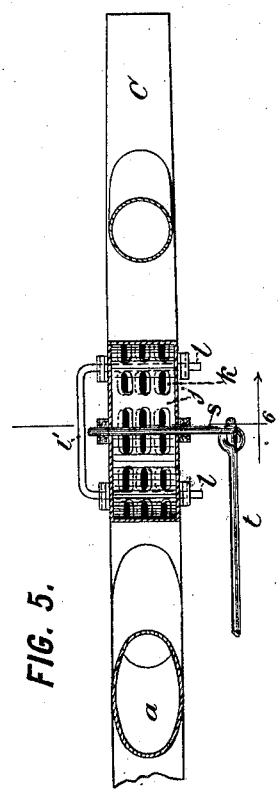
WITNESSES:
John Becker
Fred White
INVENTOR:
Clinton H. Leggett,
By his Attorneys,
Arthur C. Fraser & Co.

UNITED STATES PATENT OFFICE.

CLINTON H. LEGGETT, OF NEW YORK, N. Y.

INSECT-POWDER DISTRIBUTER.

SPECIFICATION forming part of Letters Patent No. 421,942, dated February 25, 1890.

Application filed September 20, 1889. Serial No. 324,546. (No model.)

*To all whom it may concern:*

Be it known that I, CLINTON H. LEGGETT, of New York city, New York, have invented certain new and useful Improvements in Insect-Powder Distributers, of which the following is a specification.

This invention relates to apparatus for distributing insect-powder or other substances in powdered form, and which are principally employed for directing powder onto the leaves of plants or trees.

It relates to that class of insect-powder distributers in which a fan is employed to produce a rapid current of air and the powder is fed or sifted from a reservoir into the air-current.

A powder-distributer of this general character is shown in my patent, No. 376,600, dated January 17, 1888, upon which my present invention constitutes an improvement.

My present invention provides means for controlling at will the supply of powder sifted into the air-current, or for shutting off such supply at will, means for preventing the falling back of the powder into the fan, an improved agitator for stirring the powder, and improvements in the general construction and arrangement of parts, whereby the apparatus is made more compact and easier to carry and operate.

Figure 1 of the accompanying drawings is a side elevation of a "powder gun" or distributer constructed according to the preferred form of my invention. Fig. 2 is a vertical longitudinal mid-section thereof. Fig. 3 is a transverse section thereof on the lines 3 3 in Figs. 1 and 2. Fig. 4 is a vertical longitudinal mid-section of a modified construction. Fig. 5 is a horizontal section thereof on the line 5 5 in Fig. 4. Fig. 6 is a transverse section on the line 6 6 in Figs. 4 and 5.

The apparatus comprises a blower A, a powder-reservoir B, an air-tube $a$, leading from the blower to beneath the powder-reservoir, and a delivery-pipe C, through which the air-current and the powder carried by it are discharged. This delivery-pipe may be carried to any length and may terminate in any sort of spout or nozzle C', for directing powder upwardly, downwardly, or to either side.

Between the powder-reservoir B and the tube C is a chamber B', through the medium of which the reservoir and tube are connected and put into communication. The chamber B' is preferably a tube or shell terminating at its junction with the tube C, as shown in Fig. 3, and is preferably constructed to contain the powder agitating, sifting, and regulating devices; but, if desired, it may be omitted and the reservoir and tube C connected directly together. The tube C is extended backwardly or downwardly past the reservoir B and beyond the junction of the tube $a$ into contact with the casing of the fan A, against which it is fastened, so that its end is thereby closed, forming a chamber $b$, Fig. 2.

The parts A, B, B', and $a$ constitute the frame-work of the apparatus, which, however, is stiffened by the addition of tubes $c$ and $d$, as shown, which serve as strengthening-braces and are also useful as handles, by which to grasp the apparatus.

The fan A is driven by a crank D through a train of gears $e\ f\ g\ h$, by which the speed of rotation is multiplied in order to drive the fan at a high velocity. These gears turn on studs or pins projecting from a rigid cast plate $i$, which is fastened to the side of the fan-casing by rivets or other fastenings at its end $i'$, and through lateral ears or legs $i^2\ i^3$, which project from its opposite sides. By these three feet or fastenings the plate $i$ is thus firmly mounted on the fan-casing and securely braced to resist the thrust of the crank D.

In the bottom of the powder-reservoir B, and separating it from the chamber B', is fixed a perforated plate or sieve $j$, and directly beneath this plate is another like plate $k$, which, however, is not fixed, but it is capable of motion in one direction or another in order that when in one position its perforations shall register with those of the plate $j$, while when moved to another position they will be brought out of register therewith, so that the plate $k$ thus serves as a register to close the perforations in the plate $j$, and thereby to stop the delivery of powder from the reservoir B.

In Figs. 1, 2, and 3 the plate $k$ is movable in a longitudinal direction, being mounted on a rod $l$, which extends longitudinally over the tube C and passes at its opposite ends through the ends of the chamber B', one end being curved to form a handle l'. Where it passes out through the ends of the chamber B' the openings in the latter are packed with small pieces of leather m m, which are pierced for the passage of the rod through them, and which are held in place by clips of bent sheet metal n, soldered to the ends of the chamber B'. These pieces of leather embrace the rod l so closely as to prevent the working out of powder around the rod. On the forward or upper end of the rod k, which is screw-threaded, is screwed a nut p, as shown in Figs. 1 and 2. By an adjustment of this nut the extent to which the plate k can be moved to uncover the perforations in the plate j can be adjusted, and thereby the discharge of powder from the reservoir can be regulated. Thus the farmer by an adjustment of this nut can prevent the waste of powder when the apparatus is being used by an inexperienced or careless employé.

Within the reservoir B and moving close above the sieve-plate j is an agitator E, which in the construction shown in Figs. 1, 2, and 3 consists of a blade q, mounted on arm r, which is fixed on a spindle s, extending transversely through the reservoir B and passing out through the opposite sides thereof, one end being formed with a crank-arm s', which projects downwardly and is pivoted at its lower end to a connecting-rod t, the opposite end of which engages a stud u at the junction of the crank D with a wheel e. By the rotation of the crank a vibratory motion is imparted to the arm s', and hence to the arm r, the latter being vibrated through the arc indicated by dotted lines in Fig. 2. This vibratory motion causes the blade q to reciprocate close above the sieve-plate j, and consequently to agitate the powder, break up any lumps, and insure the regular and constant feeding of the powder through the sieve and into the air-current. Where the spindle s passes out through the opposite sides of the reservoir B the holes in the latter are packed by means of pieces of leather m', pierced for the passage of the spindle through them, and held in place by bent metal clips n', soldered to the outer sides of the reservoir. Pieces of felt, india-rubber, or other suitable substance might be substituted for leather as the material for the stuffings m and m'.

In my improved construction of insect-powder distributer the fan-casing constitutes the base or lower part of the apparatus, the gearing and crank D being arranged between the axis of the fan and the reservoir. The apparatus is thus made very compact. On the rear of the fan-casing is formed a hook v, designed to be thrust into the belt of the person using the apparatus.

In use the apparatus is usually or frequently tilted up, so that the powder as it falls into the blast of air tends by gravity to descend toward the fan. Ordinarily the blast of air is sufficient to carry the powder out and prevent its falling back, but occasionally in the hands of a careless or incompetent operator the fan will be run so slowly at times that some powder will be able to fall back against the reduced current. With the construction heretofore employed this powder has occasioned trouble or annoyance by falling into the fan-casing, thereby clogging the fan. I overcome this difficulty according to my present invention by providing the chamber b, which constitutes a pocket into which the powder will fall if the air-blast is insufficient to carry it out. The powder is easily removed from this pocket by tilting the apparatus with the fan uppermost, whereupon the powder slides out through the tube C, whereas if the powder were accumulated in the fan-casing its removal would be attended with much greater difficulty.

In the modification shown in Figs. 4, 5, and 6 the sieve-plates j and k are curved in the segment of a cylinder the axis of which coincides with the axis of the spindle s of the agitator. The perforations in the sieve-plates are in the form of elongated openings or slots, as shown in Fig. 5. The movable plate k moves laterally instead of longitudinally, being mounted on two rods l l, connected on one side through a handle l', both being preferably made of one wire bent into U shape. The agitator E has the same movement as in the construction shown in Figs. 1, 2, and 3; but it is formed with four arms r r instead of one, as shown in Fig. 4, these arms being duplicated on opposite sides of the chamber B', as shown in Fig. 6, the arms on opposite sides being preferably connected through a curve or loop r', within which is fixed the blade q. By the oscillation of this agitator through approximately a quarter of a revolution its two lower arms will sweep over the entire length of the sieve-plates, while its two upper arms will keep the mass of powder above thoroughly agitated. In this respect this construction of agitator and sieve-plates is preferable to that first described.

It will of course be understood that my invention is not necessarily limited to the precise details of construction herein set forth. The constructions which I have described are those which I consider preferable and which are the most perfect of any that I have thus far designed or employed. The apparatus may, however, be variously otherwise constructed without departing from my invention. For example, the powder-pocket b may be constructed otherwise than as a continuation of the tube C. In lieu of the rotary fan A, any other suitable air-forcing device may be used, although I prefer the fan. Any other adjustable stop may be substituted for the nut p as a means for adjusting the extent of opening of the registering sieve-plates.

I claim as my invention the following defined novel features and combinations, substantially as hereinbefore specified, namely:

1. In a powder-distributer, the combination, with an air-forcing device, a delivery-tube leading upwardly therefrom, and a powder-reservoir discharging into said delivery-tube above said air-forcing device, of a chamber or pocket communicating with the lower side of the delivery-tube between the reservoir and air-forcing device, and adapted to collect and retain any powder which the air-current may fail to carry out.

2. In a powder-distributer, a rotary air-forcing device having a circular casing, a powder-delivery tube C, consisting of a straight pipe fastened at one end to the lower side of said casing and extending thence tangentially, and a powder-reservoir discharging into said delivery-tube, in combination with a diagonal air-tube $a$, connecting said air-forcing casing and said delivery-tube, said tube $a$ opening into said delivery-tube between said air-forcing casing and said powder-reservoir, whereby the air-passage formed by said air-tube is angular relatively to the delivery-tube, so that the entry of powder into the air-forcing device is prevented, substantially as set forth.

3. In a powder-distributer, the combination of a rotary fan, a delivery-tube leading therefrom, a powder-reservoir discharging into said tube, a crank arranged between the fan-casing and reservoir, multiplying-gearing interposed between the crank and the fan-spindle, the fan-casing constructed to constitute the rear or base of the apparatus, and a hook $v$, applied to said fan-casing, whereby the distributer may be attached to a suitable support, as the belt of the operator, substantially as set forth.

4. In a powder-distributer, the combination, with an air-forcing device, a delivery-tube leading therefrom, a powder-reservoir discharging into said tube, and an operating-crank, of an agitator comprising a blade or arm adapted to vibrate within the powder-reservoir, an oscillatory spindle mounted therein and formed with a crank-arm exterior thereto, and a connecting-rod jointed to said crank-arm at one end and to the operating-crank at the other end.

5. In a powder-distributer, the combination, with an air-forcing device, a delivery-tube leading therefrom, a powder-reservoir discharging into said tube, and a perforated sieve-plate intervening between said reservoir and tube, of a similar perforated plate movable relatively to said sieve-plate to bring its perforations into coincidence or more or less out of coincidence with the perforations thereof, and thereby to graduate or cut off the discharge of powder through the sieve, and means for moving said plate from the exterior.

6. In a powder-distributer, the combination, with an air-forcing device, a delivery-tube leading therefrom, a powder-reservoir discharging into said tube, and a perforated sieve-plate intervening between said reservoir and tube, of a similar perforated plate movable relatively to said sieve-plate to bring its perforations into coincidence or more or less out of coincidence with the perforations thereof, an exterior handle connected to and by which to move said plate, and an adjustable stop, as $p$, for limiting the movement of said plate toward the position of coincidence of the respective perforations.

In witness whereof I have hereunto signed my name in the presence of two subscribing witnesses.

CLINTON H. LEGGETT.

Witnesses:
GEORGE H. FRASER,
ARTHUR C. FRASER.